United States Patent
Badran-Louca et al.

(10) Patent No.: US 7,793,079 B2
(45) Date of Patent: Sep. 7, 2010

(54) METHOD AND SYSTEM FOR EXPANDING A CONDITIONAL INSTRUCTION INTO A UNCONDITIONAL INSTRUCTION AND A SELECT INSTRUCTION

(75) Inventors: Serena Badran-Louca, Raleigh, NC (US); Rodney Wayne Smith, Raleigh, NC (US); Michael Scott McIlvaine, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 11/769,132

(22) Filed: Jun. 27, 2007

(65) Prior Publication Data

US 2009/0006811 A1    Jan. 1, 2009

(51) Int. Cl.
G06F 9/30 (2006.01)
(52) U.S. Cl. .................................. 712/209; 712/210
(58) Field of Classification Search ............... None
See application file for complete search history.

(56) References Cited

U.S. PATENT DOCUMENTS

| | | | | |
|---|---|---|---|---|
| 6,449,713 | B1 * | 9/2002 | Emer et al. | 712/234 |
| 7,010,670 | B2 | 3/2006 | Kurata | |
| 2005/0081017 | A1 * | 4/2005 | Rupley et al. | 712/208 |
| 2006/0179288 | A1 * | 8/2006 | McIlvaine et al. | 712/226 |

FOREIGN PATENT DOCUMENTS

| | | |
|---|---|---|
| CA | 2356805 | 3/2003 |
| WO | 0000878 | 1/2000 |

OTHER PUBLICATIONS

Rolaz, L., An Implementation of If-conversion using select instructions for Machine SUIF, Swiss Federal Institute of Technology, Mar. 2003, 7 pages.*
Mahlke, S.A. etal., A Comparison of Full and Partial Predicted Execution Suport for ILP processors, ACM, 1995, pp. 138-149.*
Sharangpani, H, etal., Itanium Processor Microarchitecture, 2000, IEEE, pp. 24-43.*
International Search Report, PCT/US08/068535, International Search Authority, European Patent Office, Oct. 27, 2008.
Written Opinion, PCT/US08/068535, International Search Authority, European Patent Office, Oct. 27, 2008.
Tyson et al., "Evaluating the Effects of Predicated Execution on Branch Prediction," International Journal of Parallel Programming, Apr. 1, 1996, pp. 159-186, vol. 24, No. 2, Plenium Press, New York, USA, XP000582804.

(Continued)

*Primary Examiner*—Eric Coleman
(74) *Attorney, Agent, or Firm*—Peter M. Kamarchik; Nicholas J. Pauley; Sam Talpalatsky (57) ABSTRACT

A method of expanding a conditional instruction having a plurality of operands within a pipeline processor is disclosed. The method identifies the conditional instruction prior to an issue stage and determines if the plurality of operands exceeds a predetermined threshold. The method expands the conditional instruction into a non-conditional instruction and a select instruction. The method further executes the non-conditional instruction and the select instruction in separate pipelines.

21 Claims, 6 Drawing Sheets

OTHER PUBLICATIONS

Steven et al., "HARP: A Parallel Pipelined RISC Processor," Microprocessors and Microsystems, Nov. 1, 1989, pp. 579-587, vol. 13, No. 9, IPC Business Press Ltd., London, GB, XP000081218.

Moreno, "IBM Research Report Dynamic Translation of Tree-Instructions into VLIWs," Jul. 18, 1996, pp. 1-29, vol. RC 20505, No. 90881, IBM Research Report, San Jose, CA, USA, XP007901401.

Brown et al., "Conditionally Executable Instructions," IP.com Journal, Dec. 1, 1971, IP.com Inc., West Henrietta, NY, USA, XP013065083.

* cited by examiner

INSTRUCTION:        OPERATION

A:                  ADDEQ $R_1, R_2, R_3, R_4$

B:                  SUB $R_5, R_6, R_7$

C:                  MUL $R_9, R_8, R_5$

FIG. 3A

INSTRUCTION:        OPERATION $A_1$:              ADD $T_1, R_2, R_3, R_4$ $A_2$:              MOVEQ $R_1, T_1$

FIG. 3B

| INSTRUCTION: | OPERATION |
|---|---|
| D: | EORNE $R_1, R_2, R_3, R_4$ |
| E: | SUB $R_5, R_6, R_7$ |
| F: | ORR $R_5, R_8, R_5$ |

FIG. 4A

| INSTRUCTION: | OPERATION |
|---|---|
| $D_1$: | EOR $T_1, R_2, R_3, R_4$ |
| $D_2$: | MOVNE $R_1, T_1$ |

METHOD AND SYSTEM FOR EXPANDING A CONDITIONAL INSTRUCTION INTO A UNCONDITIONAL INSTRUCTION AND A SELECT INSTRUCTION

FIELD OF DISCLOSURE

The present invention relates generally to computer systems, and more particularly to a method and a system for expanding a conditional instruction into an unconditional instruction and a select instruction.

BACKGROUND

A processor pipeline is composed of many stages where each stage performs a specific function related to an instruction. Each stage is referred to as a pipe stage or pipe segment. The stages are connected together to form the pipeline. Instructions enter at one end of the pipeline and exit at the other end. The instructions flow sequentially in a stream through the pipeline stages. The stages are arranged so that several stages can be simultaneously processing several instructions. Simultaneously processing multiple instructions at different pipeline stages allows the processor to process instructions faster than processing one instruction at a time, thus improving the execution speed of the processor.

Within the processor, there may be multiple pipelines processing instructions. The individual pipelines may perform unique processor functions. For example, a processor may have one pipeline for executing load/store instructions and another pipeline for executing integer or logic based instructions. By separating the pipelines based on functionality of the instruction, the processor may more efficiently utilize its resources when executing the instructions.

When the processor processes instructions, information necessary to execute the instruction is gathered. The information may be related to each operand in the instruction. Within the processor, the amount of information that may be simultaneously gathered for each instruction may be limited by the number of ports within the processor's register file. The processor's register file may consist of a large array that is read and write accessible. The number of read ports that the processor supports may be limited by the available hardware space within the processor as well as the additional power necessary for each read port. The processor utilizes each read port to retrieve information related to each operand in the instruction.

As more complex instructions are added to the processor's instruction set, additional read ports may be required in order to simultaneously retrieve information for all of the operands in the instructions when the instruction is executing. Commonly, newer instructions may have more operands than read ports. If the processor does not have enough read ports, the instruction may need additional processor cycles to execute. In turn, the processor's efficiency may be impacted.

One type of instruction that may be affected by an execution delay related to the restriction of the number of read ports is a conditional instruction. Conditional instructions commonly consist of a conditional part, and a non-conditional part such as a logical function, arithmetic function, or the like. Due to the lack of read ports, a conditional instruction having more operands than read ports may need multiple processor cycles to execute.

SUMMARY OF THE DISCLOSURE

Accordingly there exists a need in the industry for a way of accelerating the execution of conditional instructions which have more operands than available read ports. The instruction execution may be accelerated by separating the conditional part of the instruction from the unconditional function. The separation creates two smaller instructions, each requiring less read ports than the original conditional instruction. The execution of the separate instructions may be performed simultaneously in different pipelines in order to take advantage of the parallel processing capabilities of the processor.

A method of expanding a conditional instruction having a plurality of operands within a pipeline processor, the pipeline processor having a plurality of pipelines, is disclosed. The method identifies the conditional instruction prior to an issue stage and determines if the plurality of operands exceeds a predetermined threshold. The method expands the conditional instruction into a non-conditional instruction and a select instruction. The method further executes the non-conditional instruction and the select instruction in separate pipelines.

A method of expanding a conditional instruction having a plurality of operands within a pipeline processor is disclosed. The method identifies that the conditional instruction has operands which exceed a predetermined threshold during a pre-decode stage. The method expands the conditional instruction into a non-conditional instruction and a select instruction when the instruction is processed in an issue stage. The method further executes the non-conditional instruction and the select instruction during an execution stage.

A method of expanding a conditional instruction having a plurality of operands within a pipeline processor is disclosed. The method identifies the conditional instruction prior to an issue stage and determines if the plurality of operands exceeds a predetermined threshold. The method expands the conditional instruction into a non-conditional instruction and a select instruction. The method further executes the non-conditional instruction and the select instruction.

A pipeline processor having a pre-decode logic circuit is disclosed. The pre-decode logic circuit is configured to identify whether a conditional instruction has operands exceeding a predetermined threshold. The pre-decode logic circuit communicates with an issue logic circuit, the issue logic circuit is configured to receive the identified conditional instruction, and expand the identified conditional instruction. The issue logic circuit communicates with execution units configured to execute the expanded conditional instruction.

A more complete understanding of the present invention, as well as further features and advantages of the invention, will be apparent from the following detailed description and the accompanying drawings.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

Figure 1:
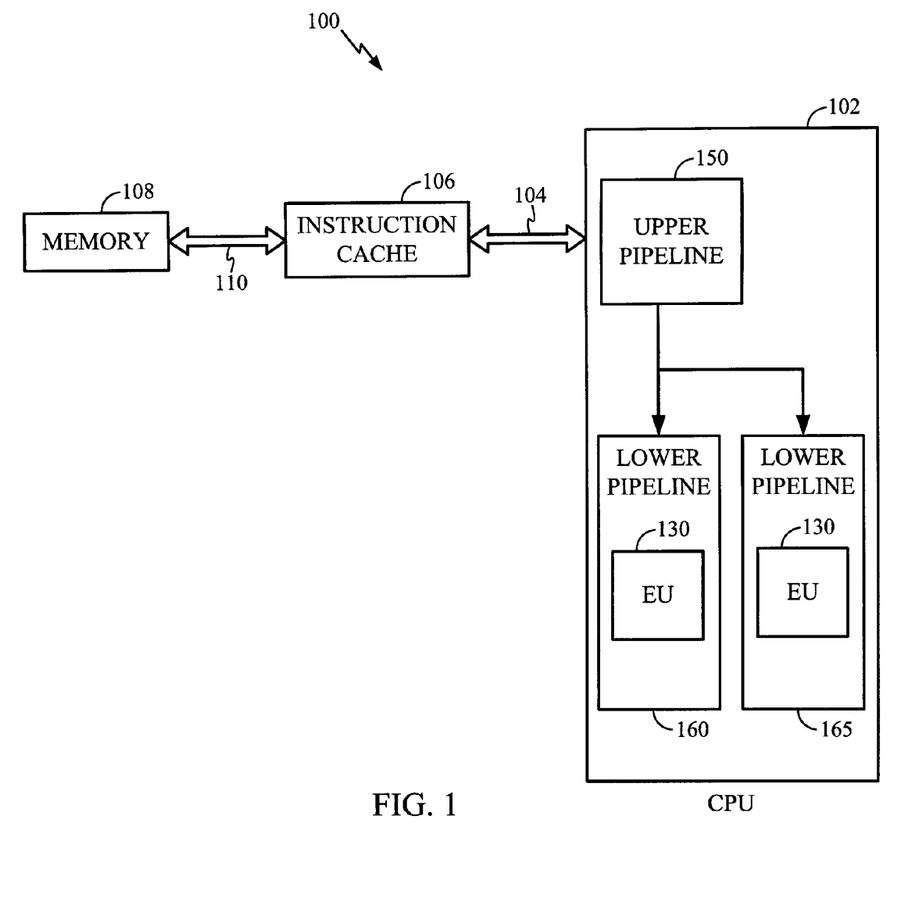
FIG. 1 shows a high level logic hardware block diagram of a processor using an embodiment of the present invention.

FIG. 1 shows a high level view of a superscalar processor 100 utilizing one embodiment of the present invention as hereinafter described. The processor 100 has a central processing unit (CPU) 102 that is coupled via a dedicated high speed bus 104 to an instruction cache 106. The instruction cache 106 is also coupled via a general purpose bus 110 to memory 108. The CPU 102 has an upper pipeline 150 coupled to lower pipelines 160 and 165. The CPU 102 controls the loading of instructions from memory 108 into the instruction cache 106. As those skilled in the art appreciate, the instruction cache 106 may be a specialized memory designed to bridge the speed gap between the memory 108 and the processor 100. Instructions fetched from memory 108 are placed in the faster instruction cache 106 which is able to be read at processor clock speeds. After the instruction cache 106 is loaded with instructions, the CPU 102 accesses them via the high speed bus 104. Instructions are loaded from the instruction cache 106 into the upper pipeline 150. After the instructions are processed in the upper pipeline 150 they are sent to the lower pipelines 160 or 165 for further processing. As is described in the discussions of FIG. 2, the upper pipeline 150 may contain logic circuitry which may identify conditional instructions having operands in excess of a predetermined threshold. After these conditional instructions have been identified, the processor 100 may process them in accordance with one embodiment of the present invention.

Instructions leave the upper pipeline 150 in sequential program order. After leaving the upper pipeline 150 the instructions may be rearranged in the lower pipelines 160 or 165 for more efficient processing. Some exemplary processing functions performed on the instructions in the upper pipeline 150 may include fetching the instruction, aligning the instruction, decoding the instruction, issuing the instruction to the lower pipelines 160 or 165 and the like. Within the lower pipelines 160 and 165 instruction processing may include, tracking the instruction, retrieving operand information for the instruction execution, executing the instruction, recording the instruction results and the like.

Lower pipelines 160 and 165 may contain various execution units (EU) 130 such as arithmetic logic units, floating point units, store units, load units and the like. For example, an EU 130 may have arithmetic logic units for executing a wide range of arithmetic functions, such as integer addition, integer subtraction, integer multiplication, bitwise logic operations (e.g. AND, NOT, OR, XOR), bit shifting and the like. Alternatively, the EU 130 may have execution units for performing load/store operations such as MOV, LOAD, and the like. In order to increase the efficiency of the processor 100, the lower pipelines 160 and 165 may be organized to perform certain functions. For example, the lower pipeline 160 may contain EUs 130 which execute arithmetic and logical instructions, while lower pipeline 165 may contain EUs 130 which execute load/store instructions. By segregating certain instruction functionality into separate lower pipelines 160 or 165, duplicate EUs 130 may not be required.

As those skilled in the art may appreciate, a pipeline stage may have a register or group of registers designed to hold an instruction. When an instruction enters a particular stage, the processor 100 loads the instruction into the register or group of registers linked to that stage. When an instruction is held in the register or group of registers within each stage, logic circuits may perform certain operations, depending on the instruction. After the logic circuits have performed the intended operation, the instruction is then passed on to the next sequential stage.

Figure 2:
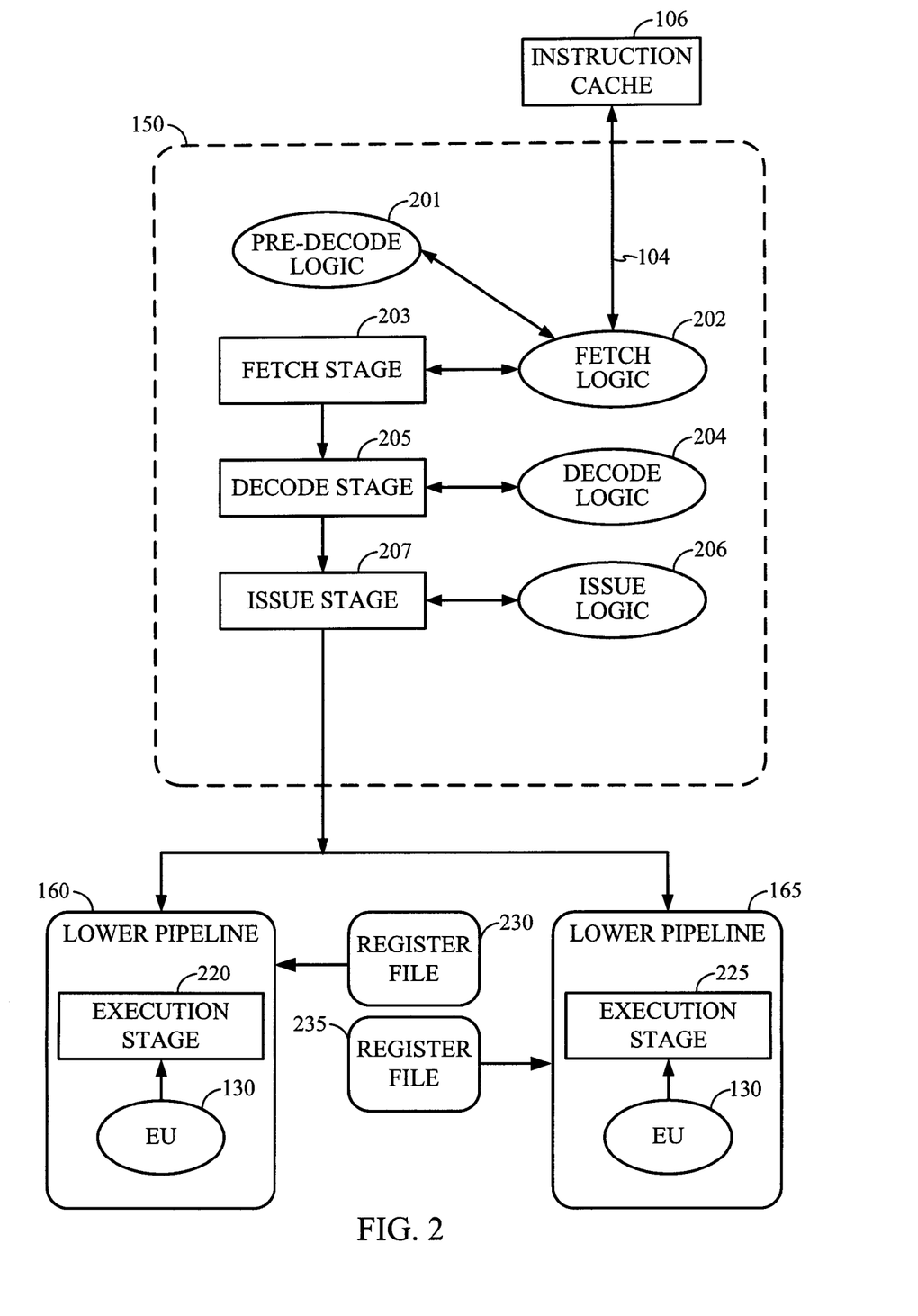
FIG. 2 displays a more detailed block diagram of the upper and lower pipelines of the CPU of FIG. 1.

FIG. 2 displays a more detailed block diagram of the upper pipeline 150 of the CPU 102. The upper pipeline 150 has a fetch logic circuit 202 coupled to the instruction cache 106 by the high speed bus 104. The fetch logic circuit 202 is also coupled to a pre-decode logic circuit 201 and a fetch stage 203. The fetch stage 203 is coupled to a decode stage 205 which in turn is coupled to an issue stage 207. Coupled to the decode stage 205 is a decode logic circuit 204. Similarly, the issue stage 207 is coupled to an issue logic circuit 206. Within the issue stage 207 are several instruction queues (not shown for ease of illustration) which hold the instructions prior to the instructions issuing to the lower pipelines 160 and 165. The instruction queues may be organized to accept instructions that will be processed in one of the lower pipelines 160 or 165. As those skilled in the art appreciate, the instruction queues act as FIFO (first in first out) buffers, holding the instructions in sequential order prior to being issued.

Instructions enter the upper pipeline 150 and move from the fetch stage 203 through the issue stage 207. After the instructions leave the issue stage 207 the instructions are executed in either in the lower pipeline 160 or the lower pipeline 165. Within the lower pipeline 160 is an execution stage 220, and the EUs 130. The lower pipeline 165 has an execution stage 225 and EUs 130. The lower pipelines 160 and 165 access the register files 230 or 235 respectively. In one embodiment, the register files 230 and 235 may be mirror images of each other. In one embodiment, the register files 230 and 235 may have three read ports for providing instruction operand information when the instruction executes in the execution stage 220 or 225.

In the upper pipeline 150, the fetch logic circuit 202 determines and subsequently fetches instructions. As part of the fetching process, the processor 100 first determines if the instructions are already in the instruction cache 106. If the instructions are not yet in the instruction cache 106, the processor 100 retrieves the instructions from memory 108 and loads them into the instruction cache 106. The pre-decode logic circuit 201 interfaces with the fetch logic circuit 202 to determine characteristic information about the instruction before the instruction is loaded into the instruction cache 106. For example, the pre-decode logic circuit 201 may identify that an instruction is a conditional instruction whose operands exceed the predetermined threshold prior to the conditional instruction being loaded into the instruction cache 106. In this example, the pre-decode logic circuit 201 may "tag" the instruction in the instruction cache 106, thus identifying that the instruction has this characteristic information. The characteristic information may be used by other logic circuits within the upper pipe 150 to speed up the processing of the instruction.

In the instruction cache 106, instructions are grouped into sections known as cache lines. Each cache line may contain multiple instructions. Within each cache line, additional information related to the instruction may be saved. Instructions may be fetched from the instruction cache 106 several instructions at a time. After the instructions are fetched by the fetch logic circuit 202, the instructions are sent to the decode stage 205.

In the decode stage 205, the instructions are decoded by the decode logic circuit 204 to identify all of the specifics of the instruction. As mentioned previously, the pre-decode logic circuit 201 may identify general characteristics of the instruction. In the decode stage 205 additional information related to the instruction is identified. For example, the type of instruction (i.e. ADDEQ, SUBEQ, AND, and the like), the specific registers to be addressed with the instruction and any dependencies of the instruction are identified in the decode stage 205 by decode logic circuit 204. Information retrieved or identified during the decode stage 205 allows the processor 100 to determine which of the lower pipelines 160 or 165 will receive the instruction for further processing. After the instruction is processed in the decode stage 205, the instruction moves to the issue stage 207.

In the issue stage 207, the issue logic circuit 206, determines which lower pipeline 160 or 165 will receive the instructions. The lower pipeline 160 may be designed to execute arithmetic instructions while lower pipeline 165 may be designed to execute load/store instructions. The issue logic circuit 206 arranges the instructions in the instruction queues according to which of the lower pipelines 160 or 165 the instruction will be sent for execution. As is explained in greater detail in the discussion of FIGS. 3A-3B and 4A-4B, the issue logic circuit 206 may expand a particular instruction that has been tagged by the pre-decode logic circuit 201 in order to increase the processor's efficiency.

From the issue stage 207, instructions are sent on to the lower pipelines 160 and 165 for execution. Other various stages may exist within the lower pipelines 160 and 165 such as a reservation stage, a register access stage and the like, but are not shown for ease of illustration. When the instruction reaches the execution stage 220 or 225, the processor 100 accesses the appropriate register file 230 or 235 to retrieve the operand information necessary to execute the instruction. As mentioned previously, the register files 230 and 235 may be mirror images of each other. Thus, when the processor 100 updates the register file 230 it also updates the register file 235. Using duplicate copies of the register files 230 and 235, the processor 100 may execute multiple instructions within each lower pipeline 160 or 165 simultaneously. After the information is retrieved from the register files, the EUs 130 execute the instructions and the results of the instruction execution are written back to the register files 225 and 235.

Figure 3A:
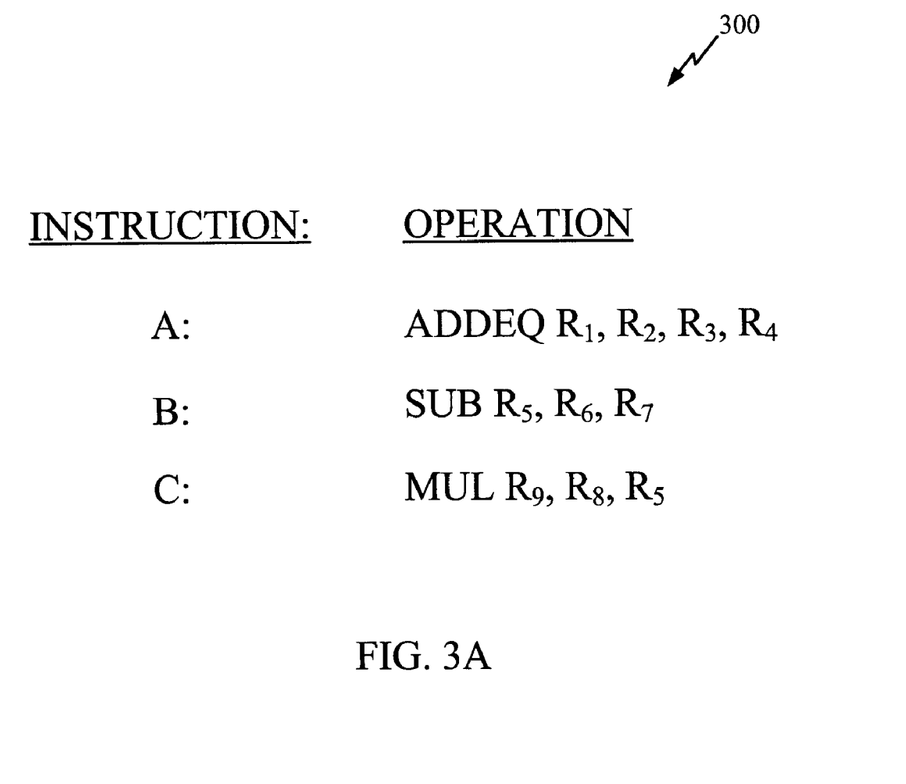
FIG. 3A displays an exemplary group of instructions executed by the processor of FIG. 1.

FIG. 3A displays an exemplary group of Instructions 300 that may be executed by the processor 100. Instruction A in FIG. 3A is a conditional add instruction having four source operands, $R_1$, $R_2$, $R_3$, and $R_4$. The instruction's source operands correspond to information read from the register files 230 and 235 through the read ports. Information sent to the register files 230 or 235 may be designated by destination operands and are written to the register files 230 and 235 using write ports. Instruction B is a subtraction instruction having two source operands ($R_7$ and $R_6$) and one destination operand ($R_5$). Instruction C is a multiply instruction having two source operands ($R_5$ and $R_8$) and one destination operand ($R_9$).

As is explained in greater detail, instruction A in its original form may not be executed by the processor 100. Instead, using one embodiment of the present invention, the processor 100 may modify instruction A into two smaller instructions for more efficient processing. For ease of illustration, instruction A is described as if it were executed by a conventional processor in order to appreciate the inventive concepts of the various embodiments.

During processing of instruction A (conditional ADD inst) by a conventional processor the values for source operands $R_1$, $R_2$, $R_3$, and $R_4$ are read from the register files 230 or 235. After the values for the source operands have been read, the value in register $R_3$ is shifted by the value contained in $R_4$ and the results are added with the contents of register $R_2$. If the conditional Zero flag is a "0" the results of that addition are stored in $R_1$. If the Zero flag is a "1", the content of register $R_1$ is restored to its previous value.

As those skilled in the art appreciate, the conditional flags within an ARM® processor may correspond to the NZCV status bits (N=Negative, Z=Zero, C=Carry, V=Overflow). The conditional flags may be set by instructions certain instructions such as a compare instruction and the like. The processor 100 uses the condition flags to determine whether a conditional instruction executes or not. If a conditional instruction does not execute due to the condition not being met, the processor rewrites the previously read value back into the target register. For instruction A, the target register is $R_1$.

During the conventional processing of instruction A, the value of $R_1$ will either be the new value as calculated or the previous value of $R_1$ depending on the condition flag. If the condition is not met (i.e. the conditional Zero flag="0"), the conventional processor will cancel the write of $R_1$. One way the conventional processor performs this function is to utilize register renaming. Specifically, when instruction A executes, the old value of $R_1$ would be read and saved in another register and if the instruction did not execute, register would be renamed back to $R_1$. Utilizing register renaming in this instance may require additional processor time as well as other processor resources. Embodiments of the present invention may eliminate the need to rename registers when the conditionality of an instruction is not met.

As mentioned previously, the processor 100 may have three read ports per register file 230 or 235. Since Instruction A has four source operands, the number of source operands exceeds the number of read ports by one. The number of read ports for the register files 230 and 235 may be used as the predetermined threshold for determining if a conditional instruction is eligible for expansion. In an alternative embodiment, a processor with only two read ports per register file may have a predetermined threshold of two.

When instruction A was processed in the fetch stage 203, the pre-decode logic circuit 201 may have identified that instruction A is a conditional instruction with more operands than read ports and therefore exceeds the predetermined threshold. In this example, instruction A may have been "tagged" with this information when it was loaded into the instruction cache 106. In one embodiment, the tagged information is used by the issue logic circuit 206 to expand instruction A into two smaller instructions when instruction A is processed in the issue stage 207. Each of the two smaller instructions may then be routed to separate pipelines and executed simultaneously.

Figure 3B:
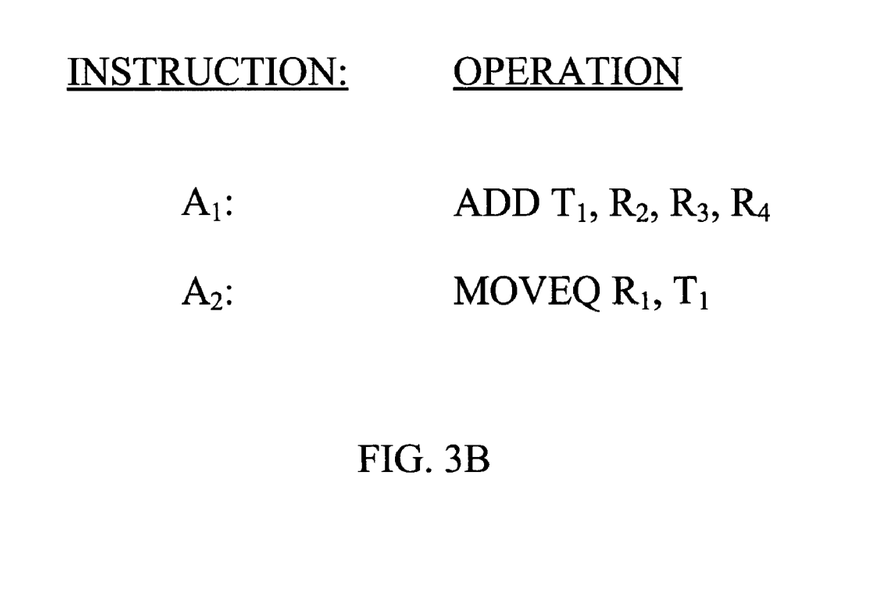
FIG. 3B displays an exemplary group of expanded instructions.

In one illustrative embodiment, instruction A is replaced by the group of instructions $A_1$ and $A_2$ as shown in FIG. 3B when instruction A is processed in the issue stage 207. The issue logic circuit 206 uses the tagged information to identify that instruction A may be expanded into two smaller instructions. As a result, the issue logic circuit 206 modifies instruction A by removing the conditionality part (as is reflected in instruction $A_1$) and creates a separate select instruction $A_2$. In the expansion shown in FIG. 3B, the select instruction $A_2$ is a conditional MOV instruction reflecting the same conditionality of instruction A. In other words, the conditionality of instructions A and $A_2$ are conditioned on the Z bit being equal to a "0". To simplify the instruction expansion process, a conditional MOV instruction reflecting the original conditionality of the expanded instruction may be used as the default select instruction. In other processor architectures, other conditional instructions may be used as the default select instruction. Because instructions $A_1$ and $A_2$ are functionally different (i.e. instruction $A_1$ is an arithmetic instruction and $A_2$ is a type load/store instruction), they may be executed in separate pipelines. As a result, instructions $A_1$ and $A_2$ may be inserted into different instruction queues within the issue stage 207. When issued, instruction $A_1$ may be sent to lower pipelines 160 for execution while instruction $A_2$ may be sent to lower pipeline 165 for execution.

Instruction $A_1$ has three source operands $R_4$, $R_3$, and $R_2$ and one destination operand, $T_1$. Instruction $A_1$ shifts the value in register $R_3$ by the value contained in $R_4$ and the results are added with the contents of register $R_2$. The results of instruction $A_1$ are saved in temporary register $T_1$. Select instruction $A_2$ is a conditional move instruction which moves the value of $T_1$ into $R_1$ if the conditional flag Z bit is a "0." Select instruction $A_2$ selects whether to write the value of $T_1$ into $R_1$ or to leave the value of $R_1$ unchanged.

When the issue logic circuit 206 creates the instructions $A_1$ and $A_2$ the processor 100 also identifies that instruction $A_1$ has a dependency on select instruction $A_2$. Specifically, a data hazard exits between instruction $A_1$ and $A_2$. Processor 100 will not execute select instruction $A_2$ until instruction $A_1$ finishes, otherwise a RAW (Read After Write) hazard occurs. To this end, the processor 100 waits until the results of instruction $A_1$ are available before executing select instruction $A_2$.

In one embodiment, the processor 100 may execute arithmetic instructions in one lower pipeline such as lower pipeline 160 while executing load/store instructions in the other pipeline 165. The embodiments as presented herein may be applied to processors which have more than two pipelines. In these embodiments, the choice of which lower pipeline to send the expanded instructions is made by the issue logic circuit 206 when the instruction is processed in the issue stage 207.

Figure 4A:
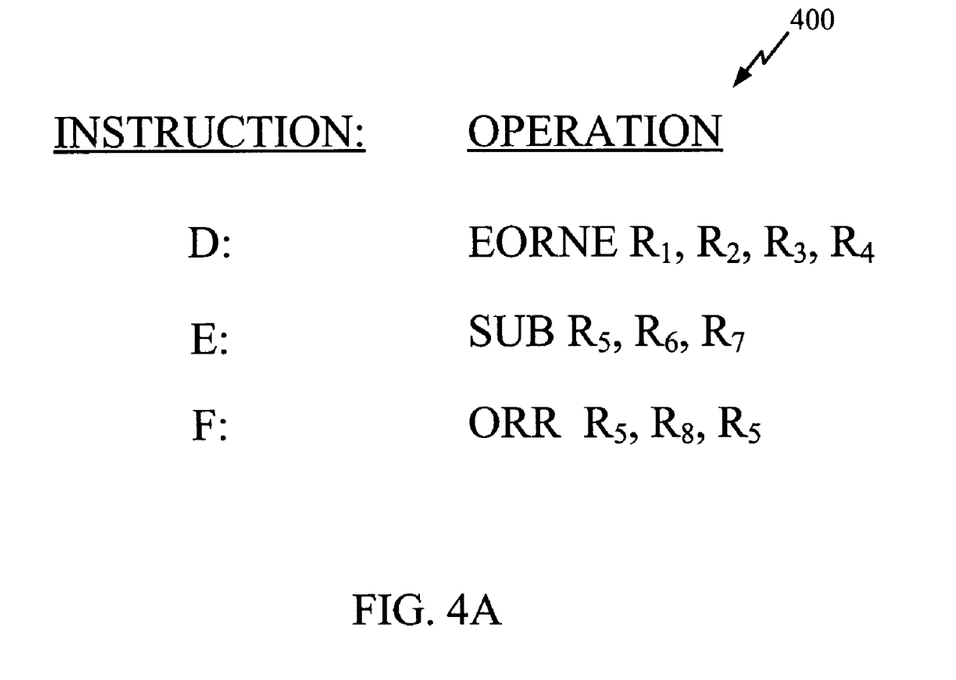
FIG. 4A shows another exemplary group of instructions executed by the processor of FIG. 1.

FIG. 4A displays another exemplary group of Instructions 400 that may be executed by the processor 100. Instruction D in FIG. 4A is an exclusive or not equal instruction having four source operands, $R_1$, $R_2$, $R_3$, and $R_4$. Instruction E is a subtraction instruction and instruction F is an OR instruction. If instruction D is executed by the processor 100, the values for source operands $R_1$, $R_2$, $R_3$, and $R_4$ are read from the register files 230 and 235. Within instruction D the value in register $R_3$ is shifted by the value contained in $R_4$ and the results are exclusively or'ed with the contents of register $R_2$. If the conditional Zero flag is a "1" the results of the exclusive or'ing are stored in $R_1$. If the Zero flag is a "0", the contents of register $R_1$ are restored to its previous value.

Figure 4B:
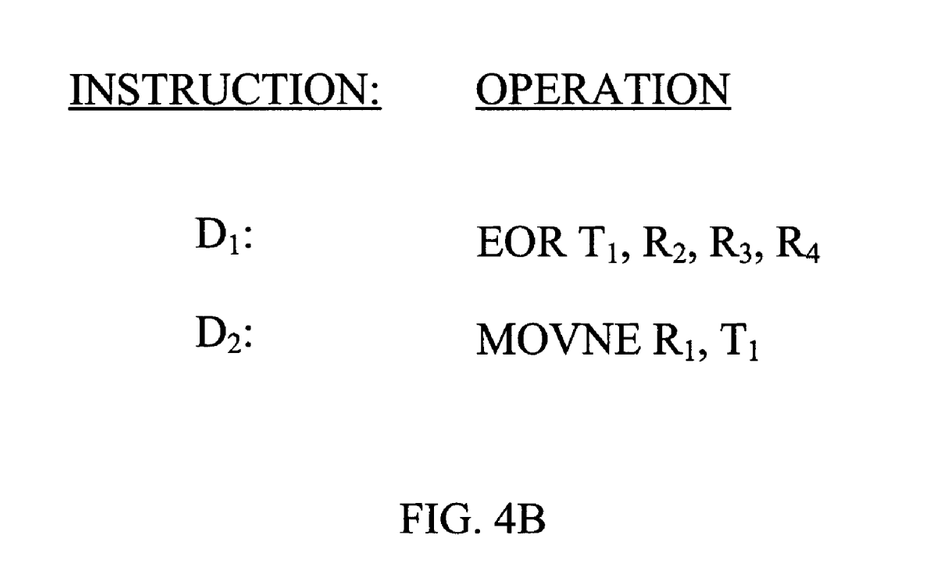
FIG. 4B shows another exemplary group of expanded instructions.

By way of another illustrative example, instruction D is replaced by the group of instructions $D_1$ and $D_2$ as shown in FIG. 4B when instruction D is processed in the issue stage 207. Similar to the way the processor 100 processes instruction A in the group of instructions 300, the issue logic circuit 206 uses the tagged information to identify that instruction D may be expanded into two smaller instructions. As a result, the issue logic circuit 206 modifies instruction D by removing the conditionality part (as is reflected in instruction $D_1$) and creates the select instruction $D_2$. As shown in the embodiment of FIG. 4B, the select instruction $D_2$ is a conditional MOV instruction reflecting the same conditionality of instruction D. The conditionality of instruction D and the select instruction $D_2$ is based on the Not Equal condition (the Z flag is ="1"). After instructions $D_1$ and $D_2$ are inserted in the issue stage 207, they are loaded into the appropriate instruction queues and are sent to different lower pipelines 160 and 165 for execution.

Instruction $D_1$ shifts the value in $R_3$ by the value contained in $R_4$ with the result of the shift exclusively or'ed with the contents of register $R_2$. The results of the exclusive or is saved in the temporary register $T_1$. The select instruction $D_2$ is a conditional move instruction which moves the value of $T_1$ into $R_1$ if the conditional flag Z bit is a "1." Similar to the select instruction $A_2$, select instruction $D_2$ selects whether to write the value of $T_1$ into $R_1$ or to leave the value of $R_1$ unchanged.

When the issue logic circuit 206 creates instructions $D_1$ and $D_2$, the processor 100 also identifies that instruction $D_1$ has a dependency on instruction $D_2$. Instruction $D_2$ can't execute until instruction $D_1$ finishes, otherwise a RAW (Read After Write) hazard occurs. The processor 100 waits until the results of instruction $D_1$ are available before executing instruction $D_2$.

Figure 5:
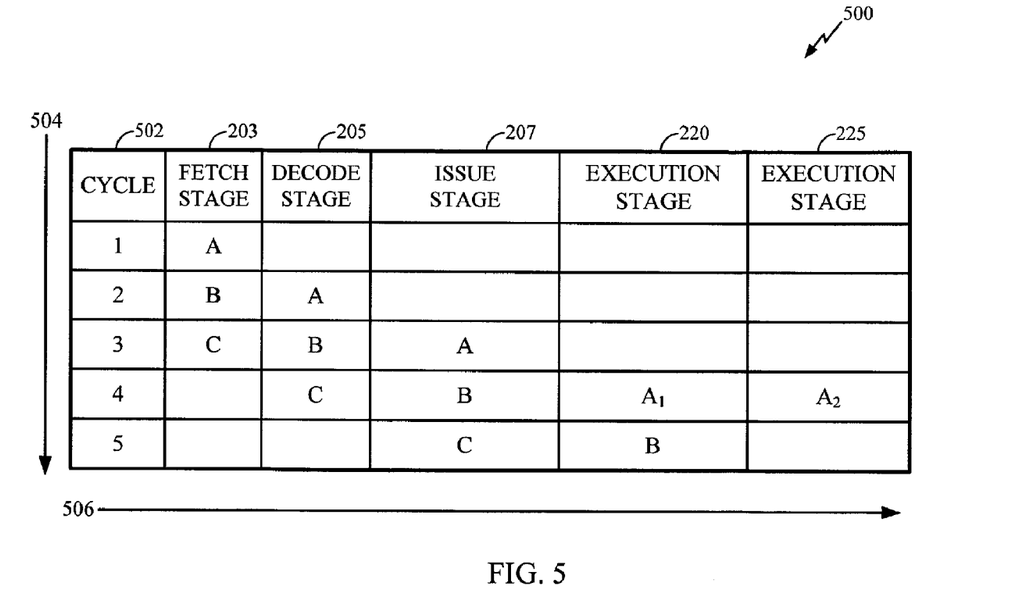
FIG. 5 shows a timing diagram of the exemplary group of instructions of FIGS. 3A-3B as they are executed through various stages of the processor of FIG. 1.

FIG. 5 displays a timing diagram 500 of the groups of instructions 300 as they are processed through the various stages of the upper pipeline 150 and lower pipelines 160 and 165. In the timing diagram 500, the processor cycle 502 is displayed along the Y-Axis 504 while the stages (the fetch stage 203, the decode stage 205, the issue stage 207, the execution stage 220 and the execution stage 225) within the processor 100 are identified along the X-Axis 506. The instructions displayed in the timing diagram 500 are shown as they are entering the various stages. In one embodiment, the timing diagram 500 displays one instruction entering each stage in each processor cycle. However, in alternative embodiments, the processor 100 may process multiple instructions per processor cycle. The teachings presented herein may be applied to a single instruction issue or multiple instruction issue processors. For ease of illustration, the group of instructions 300 is discussed although the same timing diagram applies to group of instructions 400 since these instructions are similarly expanded.

As displayed in FIG. 5, instruction A is fetched in the fetch stage 203 from the instruction cache 106 in processor cycle 1. Prior to instruction A being fetched from the instruction cache 106, the fetch logic circuit 202 retrieves instruction A from memory 108. As instruction A is loaded into the instruction cache 106 from the memory 108, the pre-decode logic circuit 201 determines that instruction A is a conditional instruction. Since instruction A is a conditional instruction, the pre-decode logic circuit 201 subsequently determines that instruction A's source operands exceed the predetermined threshold. Because instruction A has four source operands and the predetermined threshold is three, instruction A is tagged to be expanded.

From the fetch stage 203, instruction A is processed in the decode stage 205 by the decode logic circuit 204 in processor cycle 2. During the decode stage 205, the processor 100 identifies that instruction A is a conditional add instruction. Also during the decode stage 205, the processor may identify operand information as well as any dependencies linked to instruction A. Because instruction A is a conditional add instruction, the processor 100 may direct instruction A to the lower pipeline 160 as long as the lower pipeline 160 contains EUs that support arithmetic operations. However, since instruction A has been tagged by the pre-decode logic circuit 201, instruction A may not be sent to the lower pipelines 160 in its original form. After instruction A is processed in the decode stage 205, it is sent to the issue stage 207 in processor cycle 3. Also during processor cycle 2, instruction B is fetched during the fetch stage 203 by the fetch logic circuit 202.

In processor cycle 3, the processor fetches instruction C from the instruction cache 106 while instruction B is processed in the decode stage 205 by the decode logic circuit 204. When instruction A is loaded into the issue stage 207 in processor cycle 3, the issue logic circuit 206 identifies that instruction A is a tagged instruction (e.g. instruction A is a conditional instruction with more source operands than read ports), and modifies instruction A in accordance with one embodiment. In place of instruction A, the issue logic circuit 206 inserts instructions $A_1$ and $A_2$ into the instruction stream and more specifically into the appropriate instruction queue within the issue stage 207.

When the processor 100 issues instructions $A_1$ and $A_2$, the processor 100 routes the instructions to different pipelines as shown in processor cycle 4. In processor cycle 4, instruction $A_1$ is executed in the execution stage 220 in the lower pipeline 160 while the instruction $A_2$ is executed in the execution stage 225 in lower pipeline 165. By executing $A_1$ and $A_2$ in different pipelines, the two instructions may be executed during the same processor cycle which increases the processing efficiency of the processor 100. During the execution of instructions $A_1$ and $A_2$ in processor cycle 4, both register files 230 and 235 are accessed by the processor 100. First, instruction $A_1$ executes and then during the same processor cycle instruction $A_2$ executes. For simplification purposes, the timing diagram 500 shows the instructions $A_1$ and $A_2$ needing only one processor cycle to reach the execution stages 220 and 225. In practice however, instructions $A_1$ and $A_2$ may take several processor cycles to reach the execution stages 220 and 225. Instruction B is processed in the issue stage 207 and instruction C is processed in the decode stage 205 during processor cycle 4.

In processor cycle 5, instructions $A_1$ and $A_2$ have finished their execution and the register files 230 and 235 are updated with the results. Also in processor cycle 5, instruction B is executed in the execution stage 220 and instruction C is processed in the issue stage 207.

As discussed previously, other conditional instructions may be used for the select instruction (i.e. instruction $A_2$ or instruction $D_2$). For example, instead of a MOVEQ instruction for the select instruction, an ADDEQ instruction as shown below may be substituted for instructions $A_2$ or $D_2$ respectively:

$A_3$: ADDEQ R1, T1, #0; or, $D_3$: ADDNE R1, T1, #0

In this example, the two lower pipelines 160 and 165 may have EUs 130 which support arithmetic instructions. Within Instruction $A_3$, a zero is added the contents of the temporary register T1, with the results being written into $R_1$ when the conditional flag Z bit is a "1". Within Instruction $D_3$, a zero is added the contents of the temporary register T1, with the results being written into $R_1$ when the conditional flag Z bit is a "0".

Figure 6:
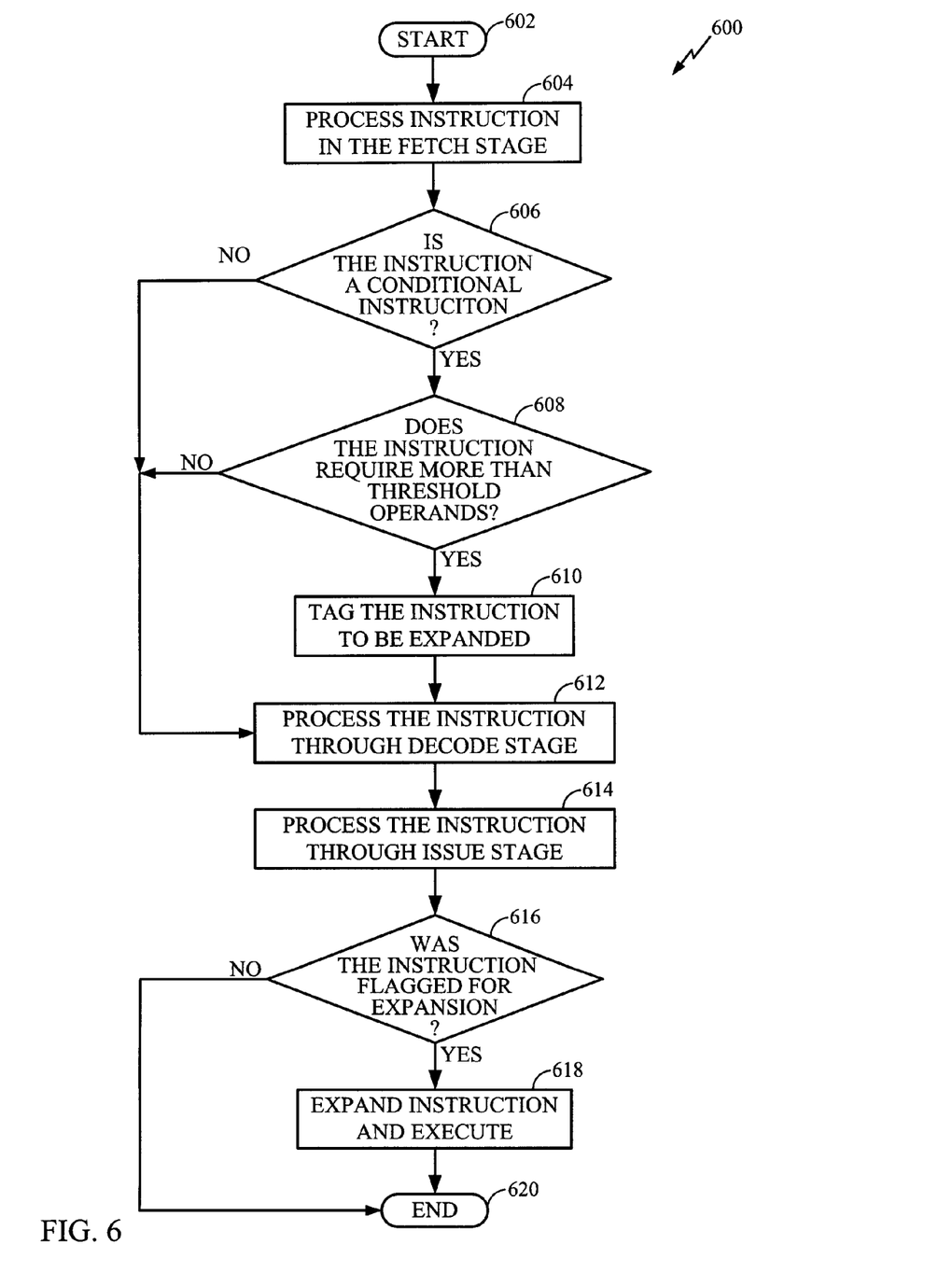
FIG. 6 shows a flow chart illustrating an exemplary instruction flow through the upper and lower pipelines of the processor of FIG. 1.

FIG. 6 is a flow chart illustrating a process 600 performed by one embodiment of the present invention. The process 600 begins at start block 602. At block 604, the processor 100 uses the fetch logic circuit 202 to fetch the instruction. If the instruction does not reside in the instruction cache 106, the fetch logic circuit 202 retrieves the instructions from memory 108. While fetching the instruction from memory 108 and putting the instruction into the instruction cache 106, the pre-decode logic circuit 201 determines if the instruction is a conditional instruction at block 606. If the instruction is not a conditional instruction, the process proceeds to block 612. If the instruction is a conditional instruction, the process 600 proceeds to decision block 608.

At decision block 608, the pre-decode logic circuit 201 determines if the number of operands of the conditional instruction exceeds the predetermined threshold. As mentioned previously, the predetermined threshold may correspond to the number of read ports for each register file 225 or 235. If at decision block 608, the conditional instruction's operands exceed the predetermined threshold, the process 600 proceeds to block 610. If the number of operands for the conditional instruction does not exceed the predetermined threshold, the process 600 continues to block 612.

At block 610, the processor 100 tags the conditional instruction as a conditional instruction that may be expanded. The tagged information may be written by the pre-decode logic circuit 201 when the conditional instruction is written into the instruction cache 106. More specifically, the tagged information may reside within the cache line for the conditional instruction. From block 610, the process 600 continues to block 612.

At block 612, the instructions are processed in the decode stage 205. As mentioned previously, when the instructions are processed in the decode stage 205, the processor 100 identifies all of the remaining information necessary to execute the instruction. From the decode stage 205, the instructions are sent to the issue stage 207 as shown in block 614. As part of the processing that occurs within the issue stage 207, the processor 100 determines if the instruction was flagged as being a conditional instruction whose operands exceeded the predetermined threshold at decision block 616. If the instruction was tagged, the conditional instruction is expanded and executed in the appropriate pipelines as displayed at block 618. From block 618, the process 600 ends at block 620. If the instruction was not flagged, the instruction is passed on the appropriate pipeline and the process 600 ends at block 620.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of expanding a conditional instruction having a plurality of operands within a pipeline processor, the pipeline processor having a plurality of pipelines the method comprising:
    identifying the conditional instruction prior to an issue stage;
    determining whether the plurality of operands exceeds a predetermined threshold;
    expanding the conditional instruction into a non-conditional instruction and a select instruction if the plurality of operands exceeds the predetermined threshold; and
    executing the non-conditional instruction and the select instruction in separate pipelines.

2. The method of claim 1 wherein the select instruction is a conditional MOV instruction.

3. The method of claim 1 wherein the select instruction is a conditional ADD instruction.

4. The method of claim 1 wherein the predetermined threshold is equal to the number of read ports on a register file.

5. The method of claim 4 wherein the register file has three read ports.

6. The method of claim 1 wherein the conditional instruction is expanded in an issue stage.

7. The method of claim 1 wherein the expanded instructions are sent to different instruction queues within the issue stage prior to being issued.

8. The method of claim 1 further comprising sending the non-conditional instruction and the select instruction to separate pipelines for execution.

9. A method of expanding a conditional instruction having a plurality of operands within a pipeline processor, the method comprising:
    identifying that the conditional instruction has operands which exceed a predetermined threshold during a pre-decode stage;
    expanding the conditional instruction into a non-conditional instruction and a select instruction when the instruction is processed in an issue stage; and,
    executing the non-conditional instruction and the select instruction during an execution stage.

10. The method of claim 9 wherein the select instruction is a conditional MOV instruction.

11. The method of claim 9 wherein the select instruction is a conditional ADD instruction.

12. The method of claim 9 wherein the operands receive information from a register file having a number of read ports and the predetermined threshold is equal to the number of read ports.

13. The method of claim 12 wherein the register file has three read ports.

14. A pipeline processor comprising:
    a pre-decode logic circuit, the pre-decode logic circuit configured to identify whether a conditional instruction has a number of operands exceeding a predetermined threshold;
    an issue logic circuit, the issue logic circuit configured to receive the identified conditional instruction, and expand the identified conditional instruction to include a non-conditional instruction and a select instruction; and
    execution units configured to execute the non-conditional instruction and the select instruction.

15. The pipeline processor of claim 14 wherein select instruction reflects the conditionality of the conditional instruction.

16. The pipeline processor of claim 14 wherein the select instruction is a conditional ADD instruction.

17. The pipeline processor of claim 14 wherein the select instruction is a conditional MOV instruction.

18. The pipeline processor of claim 14 wherein the select instruction and the non-conditional instruction are executed by execution units in separate pipelines.

19. The pipeline processor of claim 13 wherein the operands receive information from a register file having a number of read ports wherein the predetermined threshold is equal to the number of read ports.

20. The pipeline processor of claim 17 wherein the register file has three read ports.

21. A pipeline processor having a plurality of pipelines comprising:
    a conditional instruction having a plurality of operands;
    means for identifying the conditional instruction prior to an issue stage;
    means for determining whether the plurality of operands exceeds a predetermined threshold;
    means for expanding the conditional instruction into a non-conditional instruction and a select instruction if the plurality of operands exceeds the predetermined threshold; and
    means for executing the non-conditional instruction and the select instruction in separate pipelines.

* * * * *